(12) United States Patent
Park (10) Patent No.: US 10,883,511 B2
(45) Date of Patent: Jan. 5, 2021

(54) ANNULAR INJECTION APPARATUS FOR WET COMPRESSION

(71) Applicant: KOREA AEROSPACE RESEARCH INSTITUTE, Daejeon (KR)

(72) Inventor: Tae Choon Park, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 189 days.

(21) Appl. No.: 16/067,456

(22) PCT Filed: Dec. 27, 2016

(86) PCT No.: PCT/KR2016/015316
§ 371 (c)(1),
(2) Date: Jun. 29, 2018

(87) PCT Pub. No.: WO2017/116112
PCT Pub. Date: Jul. 6, 2017

(65) Prior Publication Data
US 2019/0024669 A1    Jan. 24, 2019

(30) Foreign Application Priority Data
Dec. 31, 2015   (KR) .................. 10-2015-0190618

(51) Int. Cl.
| | | |
|---|---|---|
| *F04D 29/58* | (2006.01) | |
| *F04D 29/00* | (2006.01) | |
| *F02C 7/143* | (2006.01) | |
| *F02C 3/30* | (2006.01) | |
| *B05B 1/02* | (2006.01) | |
| *B05B 1/16* | (2006.01) | |
| *F02C 6/08* | (2006.01) | |

(Continued)

(52) U.S. Cl.
CPC .............. *F04D 29/007* (2013.01); *B05B 1/02* (2013.01); *B05B 1/16* (2013.01); *F02C 3/305* (2013.01); *F02C 6/08* (2013.01); *F02C 7/1435* (2013.01); *F04D 29/5846* (2013.01); *F02C 3/064* (2013.01); *F02C 7/12* (2013.01)

(58) Field of Classification Search
CPC ..... F04D 29/007; F04D 29/5846; B05B 1/02; B05B 1/16; F02C 3/305; F02C 6/08; F02C 7/1435; F02C 3/064; F02C 7/12
See application file for complete search history.

(56) References Cited

U.S. PATENT DOCUMENTS 5,317,861 A  *  6/1994  Fox ........................... F23K 5/06
                                                                60/775
2005/0279101 A1 * 12/2005  Hoffmann ............. F02C 7/1435
                                                                60/775

(Continued)

*Primary Examiner* — Aaron R Eastman
(74) *Attorney, Agent, or Firm* — Rabin & Berdo, P.C.

(57) ABSTRACT

A technical object of the present invention is to provide an annular injection apparatus for wet compression which enables sprayed droplets to maximally evaporate without being drained as condensate water, thereby reducing compression work of the compressor. To this end, the annular injection apparatus for wet compression according to the present invention is an annular injection apparatus for wet compression which is used for a compressor including a nose cone and a bell mouth in an inlet of a flow path, in which droplets are sprayed to a portion except for portions directed toward the nose cone and the bell mouth.

3 Claims, 7 Drawing Sheets

A-A (51) Int. Cl.
*F02C 3/06* (2006.01)
*F02C 7/12* (2006.01)

(56) References Cited

U.S. PATENT DOCUMENTS

| | | |
|---|---|---|
| 2007/0022734 A1 | 2/2007 | Utamura |
| 2008/0060359 A1* | 3/2008 | Eadon ................... F02C 3/30 60/740 |
| 2009/0145100 A1 | 6/2009 | Omielan et al. |
| 2010/0146984 A1 | 6/2010 | Carroni et al. |
| 2014/0283498 A1* | 9/2014 | Horikawa ............... F23L 7/002 60/39.19 |
| 2015/0377133 A1* | 12/2015 | Kanebako ............... F01D 9/041 60/39.54 |

* cited by examiner

FIG. 1

FIG. 2

⇒ : DROPLET SPRAY DIRECTION

ANNULAR INJECTION APPARATUS FOR WET COMPRESSION

TECHNICAL FIELD

The present invention relates to an annular injection apparatus for wet compression which is used for a compressor, a gas turbine, or the like.

BACKGROUND ART

In general, wet compression and inlet fogging are evaporative cooling technologies for improving outputs and efficiency of a compressor or a gas turbine, and the wet compression is distinguished from the inlet fogging, which is a technology that evaporates all sprayed fine water particles (hereinafter, referred to as "droplets") before the sprayed droplets reach an inlet of the compressor, in that the wet compression is a technology that still evaporates the sprayed droplets even in the compressor as well as the inlet of the compressor.

A spray device, which sprays the droplets into the inlet of the compressor, is used for the wet compression.

Figure 1:
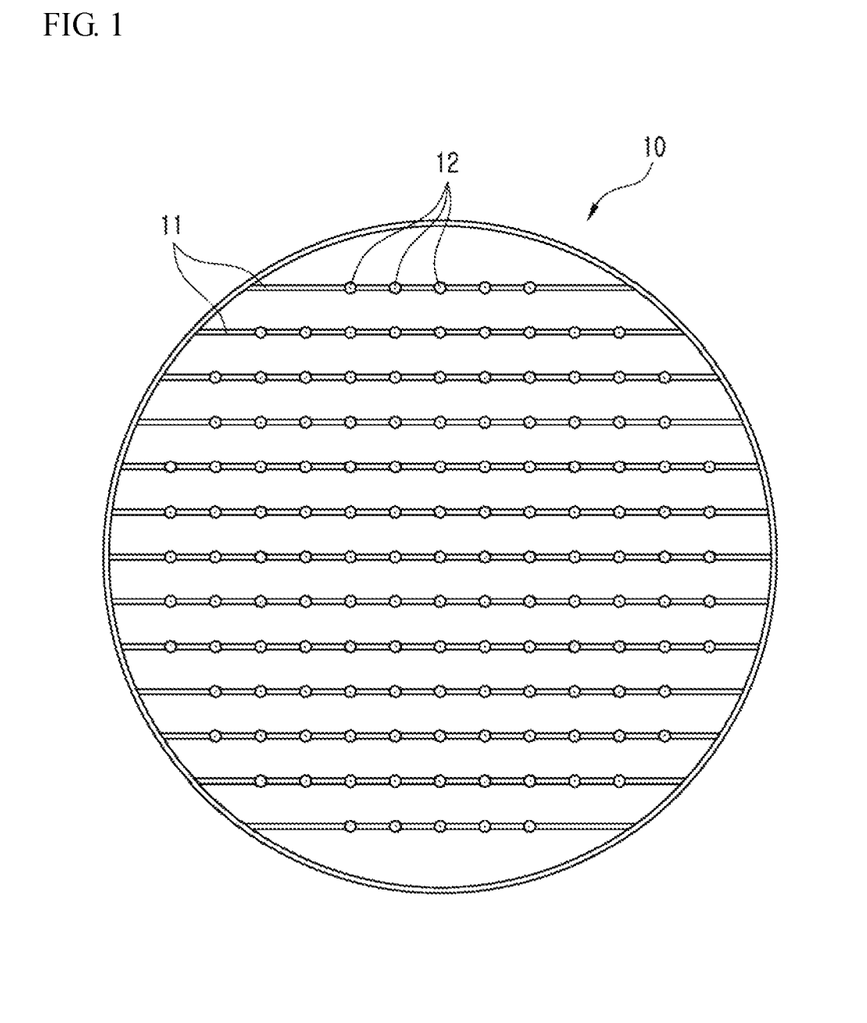
Figure 2:
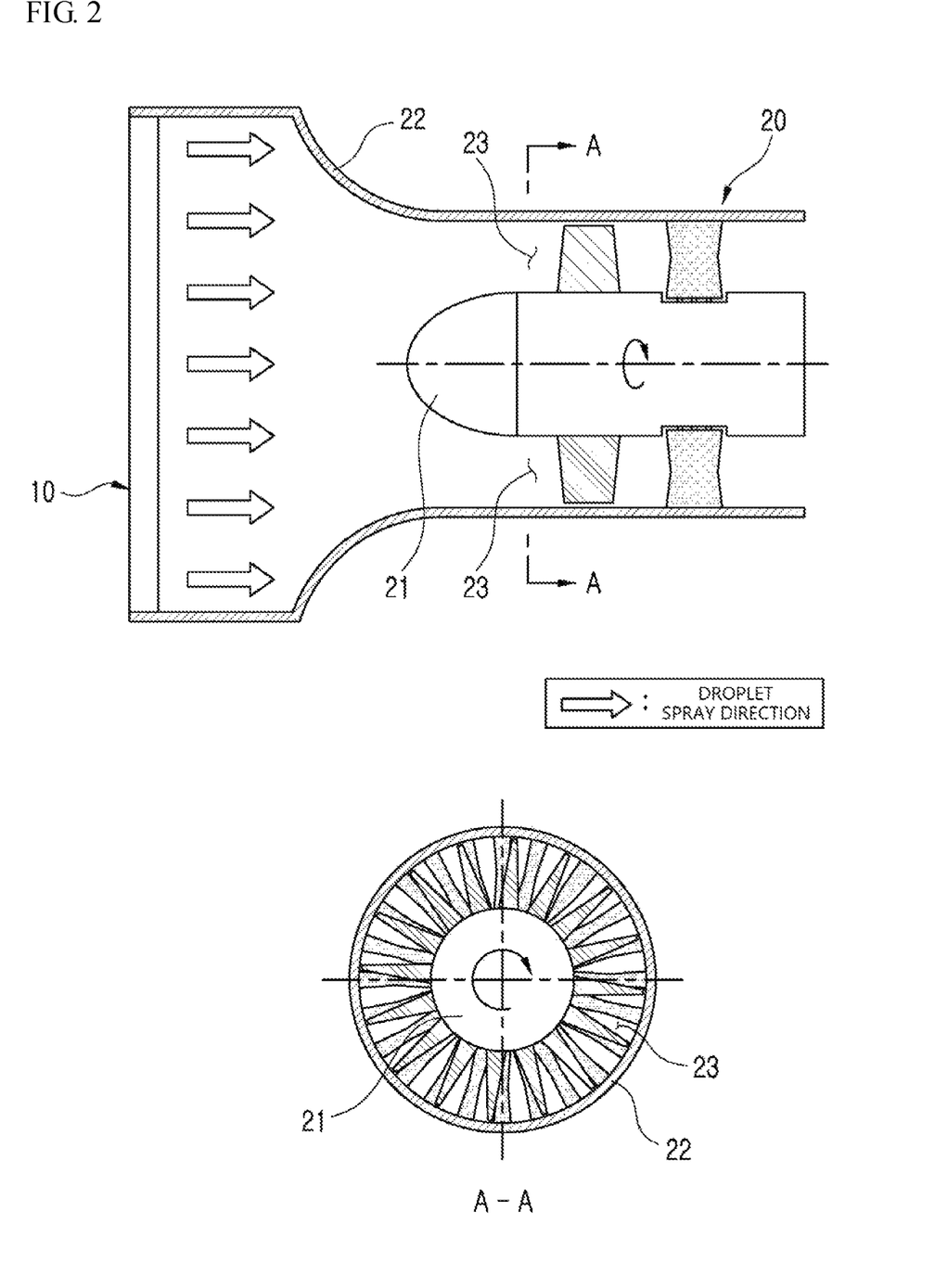

FIG. 1 is a view schematically illustrating a spray device for wet compression in the related art, and FIG. 2 is a cross-sectional view schematically illustrating a compressor in which the spray device for wet compression illustrated in FIG. 1 is installed.

As illustrated in FIG. 1, the spray device 10 for wet compression in the related art includes multiple pipes 11 which are disposed in parallel with one another at an equal interval, and multiple nozzles 12 which are provided on the respective pipes 11 and disposed entirely in the form of a lattice.

Therefore, as illustrated in FIGS. 1 and 2, droplets, which are sprayed from multiple center nozzles, among the multiple nozzles 12, which define a center portion of the spray device 10, are moved toward a nose cone 21 of a compressor 20, droplets, which are sprayed from multiple edge nozzles, among the multiple nozzles 12, which define an edge portion of the spray device 10, are moved toward a bell mouth 22 of the compressor 20, and droplets, which are sprayed from multiple effective nozzles, among the multiple nozzles 12, which are placed between the multiple center nozzles and the multiple edge nozzles, are moved toward a flow path 23 of the compressor 20.

However, in the case of the spray device 10 for wet compression in the related art, some of the droplets sprayed from the multiple center nozzles cannot be introduced into the flow path 23 of the compressor 20 but collide with a surface of the nose cone 21 and condense into condensate water to be drained, and some of the droplets sprayed from the multiple edge nozzles also cannot be introduced into the flow path 23 of the compressor 20 but collide with a surface of the bell mouth 22 and condense into condensate water to be drained, such that some of the sprayed droplets cannot be evaporated and used to absorb ambient heat to the extent of the amount of the drained condensate water, and as a result, there is a problem in that some of the sprayed droplets cannot contribute to a reduction in compression work of the compressor.

DISCLOSURE

Technical Problem

A technical object of the present invention is to provide an annular spray device for wet compression which enables sprayed droplets to maximally evaporate in a flow path of the compressor without being drained as condensate water, thereby reducing compression work of the compressor.

Technical Solution

To achieve the aforementioned object, the annular spray device for wet compression according to the exemplary embodiment of the present invention is an annular spray device for wet compression which is used for a compressor including a nose cone and a bell mouth in an inlet of a flow path, in which droplets are sprayed to a portion except for portions directed toward the nose cone and the bell mouth.

The annular spray device for wet compression may include: multiple annular pipes which are disposed concentrically to one another at intervals in a radial direction; and multiple nozzles which are disposed on the respective annular pipes and disposed at intervals in a circumferential direction, in which the multiple annular pipes are disposed at the portion except for the portions directed toward the nose cone and the bell mouth.

The multiple annular pipes may include: a first annular pipe; a second annular pipe which is disposed to be spaced apart from the first annular pipe at a first radial interval in the radial direction; and a third annular pipe which is disposed to be spaced apart from the second annular pipe at a second radial interval in the radial direction.

The multiple nozzles may include: multiple first nozzles which are disposed on the first annular pipe at a first circumferential interval in the circumferential direction; multiple second nozzles which are disposed on the second annular pipe at a second circumferential interval in the circumferential direction; and multiple third nozzles which are disposed on the third annular pipe at a third circumferential interval in the circumferential direction.

The first radial interval may be set to be greater than the second radial interval.

The first circumferential interval may be set to be smaller than the second circumferential interval, and the second circumferential interval may be set to be smaller than the third circumferential interval.

The first and second radial intervals and the first, second, and third circumferential intervals may be determined so that air contact areas of the droplets sprayed from the respective nozzles are equal to one another.

For example, the number of multiple first nozzles, the number of multiple second nozzles, and the number of multiple third nozzles may be equal to one another, the multiple nozzles may be disposed in multiple straight rows in the radial direction, and the multiple straight rows may be placed at intervals in the circumferential direction.

As another example, the number of multiple first nozzles, the number of multiple second nozzles, and the number of multiple third nozzles may be equal to one another, and the multiple nozzles may be disposed in a zigzag pattern in the radial direction.

Meanwhile, an annular spray device for wet compression according to another exemplary embodiment of the present invention may include: multiple radial pipes which are disposed at intervals in a circumferential direction and has a shape elongated in a radial direction; and multiple nozzles which are disposed on the respective radial pipes and disposed at intervals in the radial direction, in which the multiple nozzles are disposed at the portion except for the portions directed toward the nose cone and the bell mouth.

The multiple radial pipes may include first radial pipes and second radial pipes, the multiple nozzles may include eleventh, twelfth, and thirteenth nozzles which are disposed on the first radial pipe sequentially in the radial direction, and twenty-first, twenty-second, and twenty-third nozzles which are disposed on the second radial pipe and disposed on the same radii as the eleventh, twelfth, and thirteenth nozzles, and a first radial interval between the eleventh nozzle and the twelfth nozzle may be set to be greater than a second radial interval between the twelfth nozzle and the thirteenth nozzle.

A first circumferential interval between the eleventh nozzle and the twenty-first nozzle may be smaller than a second circumferential interval between the twelfth nozzle and the twenty-second nozzle, and the second circumferential interval may be smaller than a third circumferential interval between the thirteenth nozzle and the twenty-third nozzle.

The first and second radial intervals and the first, second, and third circumferential intervals may be determined so that air contact areas of the droplets sprayed from the respective nozzles are equal to one another.

Effect

As described above, the annular spray device for wet compression according to the exemplary embodiments of the present invention may have the following effects.

The exemplary embodiments of the present invention provide the technical configuration in which the droplets are sprayed toward the portion except for the portions directed toward the nose cone and the bell mouth, that is, the technical configuration of one exemplary embodiment including the multiple annular pipes and the multiple nozzles and the technical configuration of another exemplary embodiment including the multiple radial pipes and the multiple nozzles, such that the multiple annular pipes (or the multiple radial pipes) and the multiple nozzles may be installed at the portion except for the portions directed toward the nose cone and the bell mouth, and as a result, the sprayed droplets may maximally evaporate without being drained as condensate water (water created as the droplets condense on a surface of the nose cone or the bell mouth), thereby ultimately reducing compression work of the compressor.

DESCRIPTION OF DRAWINGS

FIG. 1 is a view schematically illustrating a spray device for wet compression in the related art.

FIG. 2 is a cross-sectional view schematically illustrating a compressor in which the spray device for wet compression illustrated in FIG. 1 is installed.

FIG. 3 is a view schematically illustrating an annular spray device for wet compression according to an exemplary embodiment of the present invention.

FIG. 4 is a view illustrating a state in which the annular spray device for wet compression illustrated in FIG. 3 is divided into sections which correspond to respective spray nozzles and have an equal area.

FIG. 5 is a view schematically illustrating an annular spray device for wet compression according to a modified example of the exemplary embodiment of the present invention.

FIG. 6 is a view schematically illustrating an annular spray device for wet compression according to another exemplary embodiment of the present invention.

FIG. 7 is a view illustrating a state in which the annular spray device for wet compression illustrated in FIG. 6 is divided into sections which correspond to respective spray nozzles and have an equal area.

BEST MODE

Hereinafter, exemplary embodiments of the present invention will be described in detail with reference to the accompanying drawings so that those skilled in the technical field to which the present invention pertains may easily carry out the exemplary embodiment. However, the present invention may be implemented in various different ways, and is not limited to exemplary embodiments described herein.

FIG. 3 is a view schematically illustrating an annular spray device for wet compression according to an exemplary embodiment of the present invention, and FIG. 4 is a view illustrating a state in which the annular spray device for wet compression illustrated in FIG. 3 is divided into sections which correspond to respective spray nozzles and have an equal area.

An annular spray device 100 for wet compression according to the exemplary embodiment of the present invention is an annular spray device for wet compression used for a compressor including a flow path (23 in FIG. 2), a nose cone (21 in FIG. 2) which is provided at a central portion of the flow path, and a bell mouth (22 in FIG. 2), and as illustrated in FIG. 3, the annular spray device may be designed such that droplets are sprayed toward a portion except for portions directed toward the nose cone (21 in FIG. 2) and the bell mouth (22 in FIG. 2). For example, as illustrated in FIGS. 3 and 4, the annular spray device may include multiple annular pipes 110 and multiple nozzles 120. Hereinafter, the respective constituent elements will be described in detail still with reference to FIGS. 3 and 4.

The multiple annular pipes 110 are constituent elements for guiding water to the multiple nozzles 120, and as illustrated in FIG. 3, the multiple annular pipes 110 may be disposed concentrically to one another at intervals in a radial direction, and may be disposed at a portion except for portions directed toward the nose cone (21 in FIG. 2) and the bell mouth (22 in FIG. 2). Therefore, since the multiple annular pipes 110 may be installed at the portion except for the portion directed toward the nose cone (21 in FIG. 2) or the bell mouth (22 in FIG. 2) of the compressor (20 in FIG. 2), the sprayed droplets are not drained as condensate water but may maximally evaporate while moving to the flow path (23 in FIG. 2) of the compressor.

For example, as illustrated in FIG. 3, the multiple annular pipes 110 may include first, second, and third annular pipes 111, 112, and 113. The first annular pipe 111 may be placed at a position adjacent to the nose cone (21 in FIG. 2) of the compressor, the second annular pipe 112 may be disposed to be spaced apart from the first annular pipe 111 at a first radial interval R11 in the radial direction, and the third annular pipe 113 may be positioned inward from the bell mouth (22 in FIG. 2) of the compressor and may be disposed to be spaced apart from the second annular pipe 112 at a second radial interval R12 in the radial direction. Further, although not illustrated, the multiple annular pipes 110 may be supported by a pipe support member (not illustrated).

In addition, as illustrated in FIG. 3, the first radial interval R11 may be set to be greater than the second radial interval R12. Therefore, considering that a second circumferential interval C12 between multiple second nozzles 122 is designed to be greater than a first circumferential interval C11 between multiple first nozzles 121 and the second circumferential interval C12 between the multiple second nozzles 122 is designed to be smaller than a third circumferential interval C13 between multiple third nozzles 123, air contact surfaces of the droplets sprayed from the respective nozzles 120 may have an equal area in the case in which the first radial interval R11 between the first and second annular pipes 111 and 112 is designed to be greater than the second radial interval R12 between the second and third annular pipes 112 and 113, and as a result, the evaporation may uniformly occur.

Figure 3:
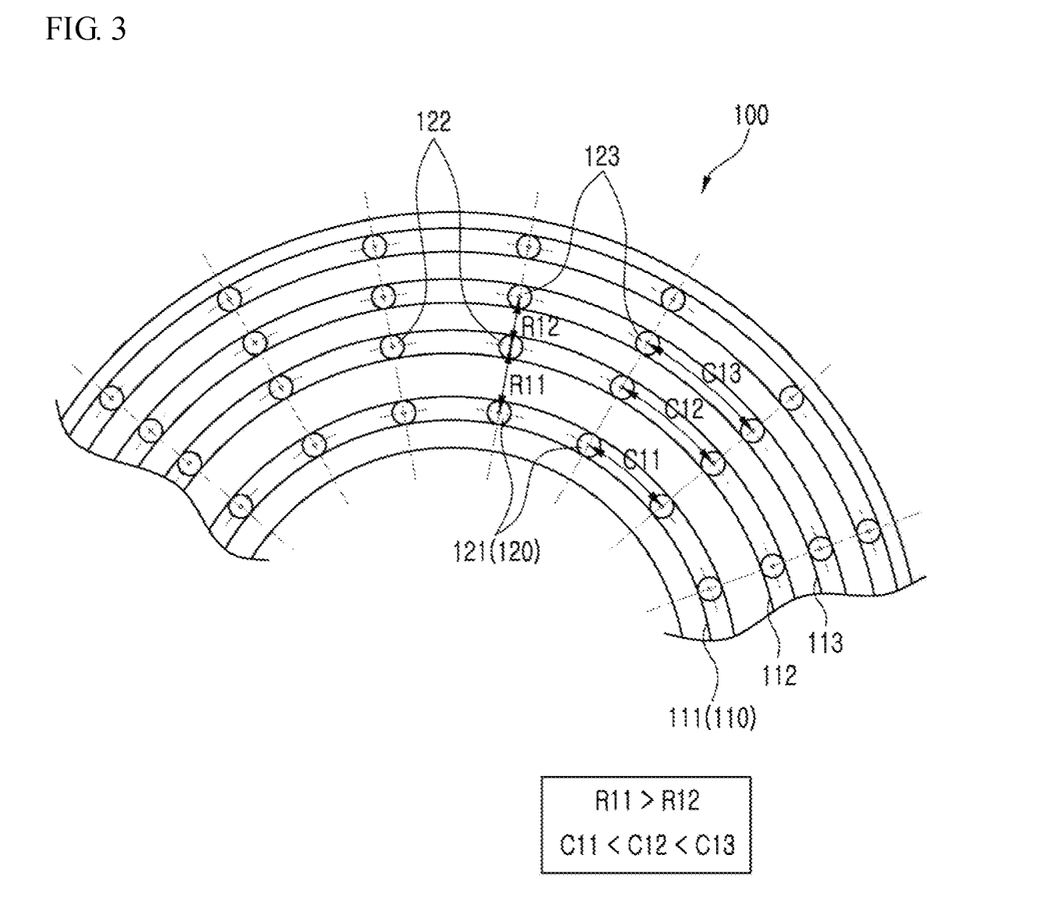

The multiple nozzles 120 are constituent elements for spraying the droplets toward the flow path (23 in FIG. 2) of the compressor, and as illustrated in FIG. 3, the multiple nozzles 120 are disposed on the respective annular pipes 110 and disposed at intervals in a circumferential direction.

For example, as illustrated in FIG. 3, the multiple nozzles 120 may include multiple first nozzles 121, multiple second nozzles 122, and multiple third nozzles 123. The multiple first nozzles 121 may be disposed on the first annular pipe 111 at the first circumferential interval C11 in the circumferential direction, the multiple second nozzles 122 may be disposed on the second annular pipe 112 at the second circumferential interval C12 in the circumferential direction, and the multiple third nozzles 123 may be disposed on the third annular pipe 113 at the third circumferential interval C13 in the circumferential direction.

In addition, as illustrated in FIG. 3, the number of multiple first nozzles 121, the number of multiple second nozzles 122, and the number of multiple third nozzles 123 may be equal to one another, the multiple nozzles 120 may be disposed in multiple straight rows in the radial direction, and the multiple straight rows may be placed at intervals in the circumferential direction.

Figure 4:
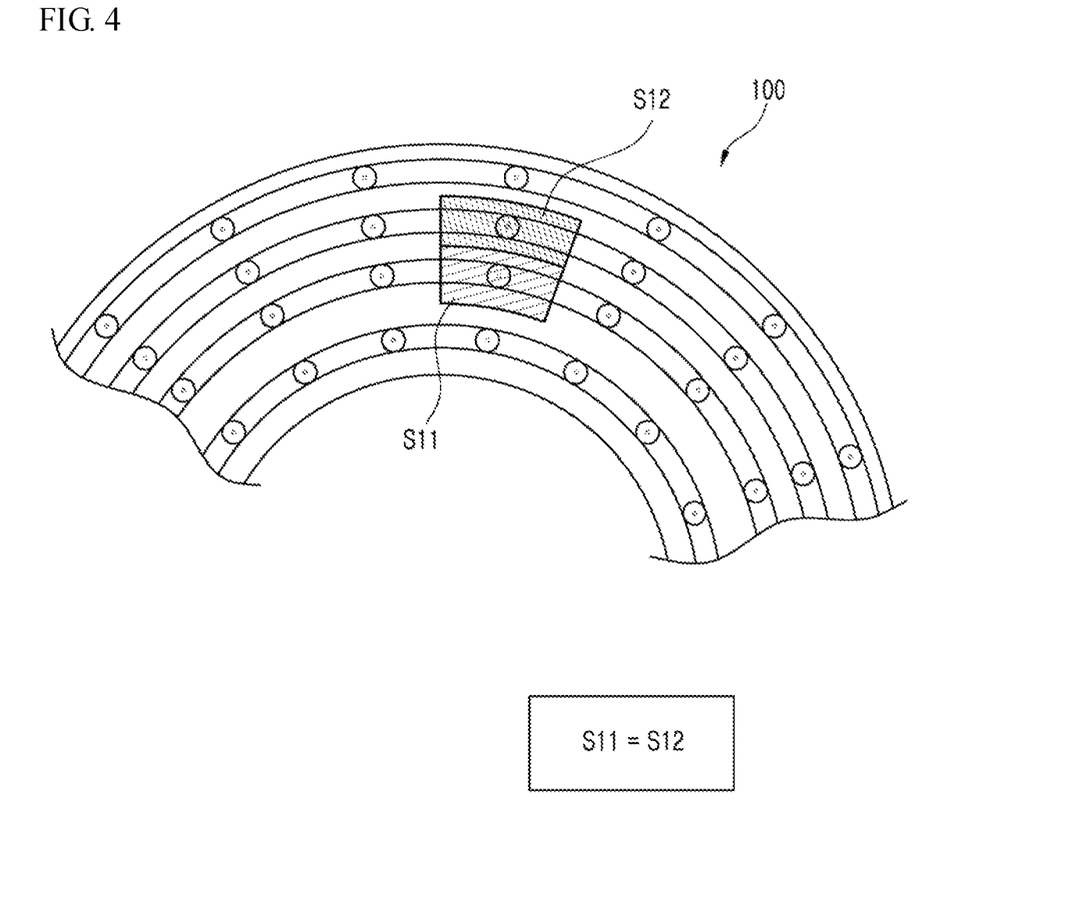

In particular, as illustrated in FIG. 4, the first and second radial intervals R11 and R12 and the first, second, and third circumferential intervals C11, C12, and C13 may be determined so that the air contact areas S11 and S12 of the droplets sprayed from the respective nozzles are equal to one another. For example, in a case in which a first air contact area S11 corresponding to one nozzle is defined by the first radial interval R11, the first circumferential interval C11, and the second circumferential interval C12 and a second air contact area S12 corresponding to another nozzle is defined by the second radial interval R12, the second circumferential interval C12, and the third circumferential interval C13, the first and second radial intervals R11 and R12 and the first, second, and third circumferential intervals C11, C12, C13 may be determined so that the first air contact area S11 and the second air contact area S12 may have an equal value. Therefore, since the air contact surfaces of the droplets sprayed from the respective nozzles 120 may have the equal area, the evaporation may uniformly occur, thereby further reducing compression work of the compressor. For reference, as illustrated in FIG. 4, each of the nozzles is positioned at a center of each of the air contact areas.

Hereinafter, an annular spray device for wet compression according to a modified example of the exemplary embodiment of the present invention will be described with reference to FIG. 5.

Figure 5:
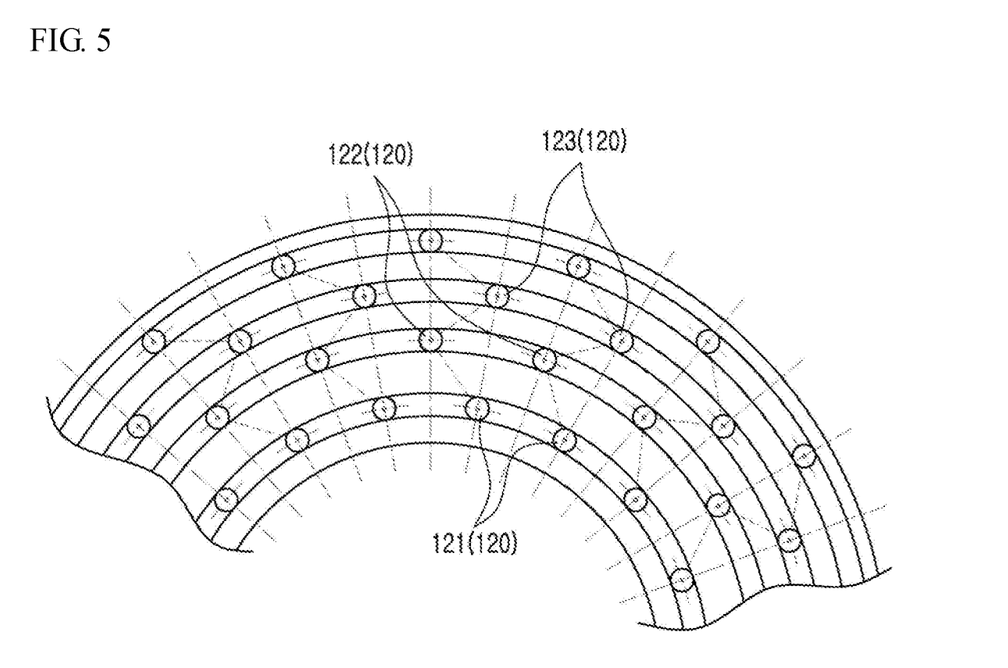

FIG. 5 is a view schematically illustrating the spray device for wet compression according to the modified example of the exemplary embodiment of the present invention.

As illustrated in FIG. 5, the annular spray device for wet compression according to the modified example of the exemplary embodiment of the present invention is identical to the annular spray device according to the previously described exemplary embodiment of the present invention except that the multiple nozzles 120 are disposed in a zigzag pattern in the radial direction. In the case in which the multiple nozzles 120 are disposed in a zigzag pattern in the radial direction, it is possible to minimize a situation in which the droplets sprayed from the respective nozzles 120 overlap one another.

Hereinafter, an annular spray device for wet compression according to another exemplary embodiment of the present invention will be described with reference to FIGS. 6 and 7.

Figure 6:
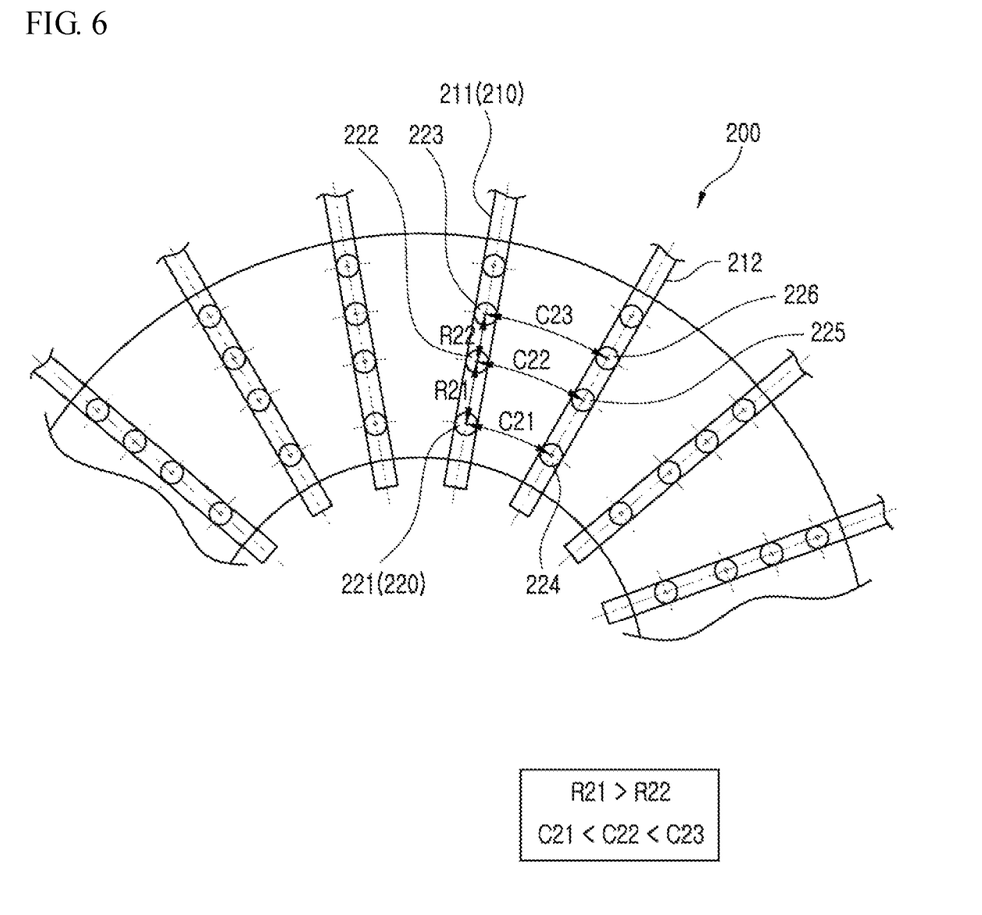
Figure 7:
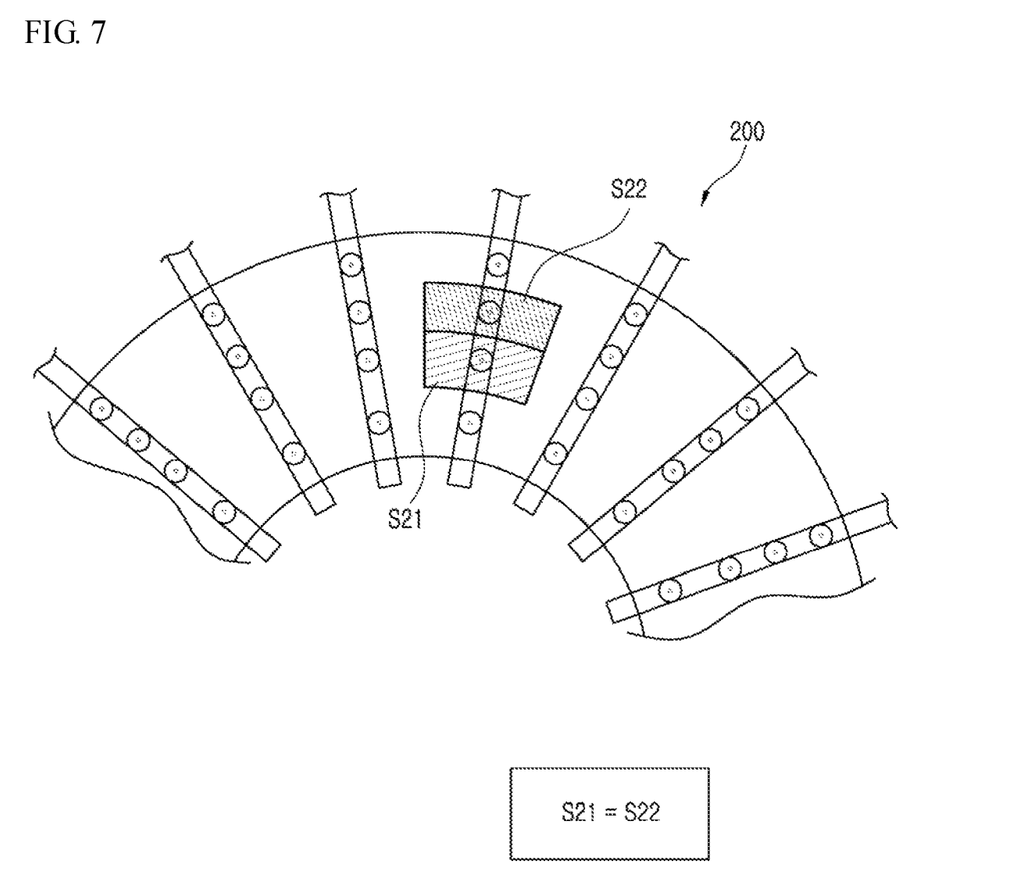

FIG. 6 is a view schematically illustrating the annular spray device for wet compression according to another exemplary embodiment of the present invention, and FIG. 7 is a view illustrating a state in which the annular spray device for wet compression illustrated in FIG. 6 is divided into sections which correspond to respective spray nozzles and have an equal area.

As illustrated in FIGS. 6 and 7, an annular spray device 200 for wet compression according to another exemplary embodiment of the present invention includes multiple radial pipes 210 and multiple nozzles 220. Hereinafter, the respective constituent elements will be described in detail still with reference to FIGS. 6 and 7.

The multiple radial pipes 210 are constituent elements for guiding water to the multiple nozzles 220, and as illustrated in FIG. 6, the multiple radial pipes 210 may be disposed at intervals in the circumferential direction and each may have a shape elongated in the radial direction, and the multiple radial pipes 210 may be disposed at a portion except for portions directed toward the nose cone (21 in FIG. 2) and the bell mouth (22 in FIG. 2). Therefore, since the multiple radial pipes 210 may be installed at the portion except for the portions directed toward the nose cone (21 in FIG. 2) and the bell mouth (22 in FIG. 2) of the compressor (20 in FIG. 2), the sprayed droplets are not drained as condensate water but may maximally evaporate while moving to the flow path (23 in FIG. 2) of the compressor.

For example, as illustrated in FIG. 6, the multiple radial pipes 210 may include first radial pipes 211 and second radial pipes 212. Further, although not illustrated, the multiple radial pipes 210 may be supported by a pipe support member (not illustrated).

The multiple nozzles 220 are constituent elements for spraying droplets toward the flow path (23 in FIG. 2) of the compressor, and as illustrated in FIG. 6, the multiple nozzles 220 may be disposed on the respective radial pipes 210 at intervals in the radial direction, and may be disposed at the portion except for the portions directed toward the nose cone (21 in FIG. 2) and the bell mouth (22 in FIG. 2).

For example, as illustrated in FIG. 6, the multiple nozzles 220 may include eleventh, twelfth and thirteenth nozzles 221, 222, and 223 which are sequentially disposed on the first radial pipe 211 in the radial direction, and twenty-first, twenty-second, and twenty-third nozzles 224, 225, and 226 which are disposed on the second radial pipe 212 and disposed on the same radii as the eleventh, twelfth, and thirteenth nozzles 221, 222, and 223, respectively.

Further, as illustrated in FIG. 6, a first circumferential interval C21 between the eleventh nozzle 221 and the twenty-first nozzle 224 may be smaller than a second circumferential interval C22 between the twelfth nozzle 222 and the twenty-second nozzle 225, and the second circumferential interval C22 may be smaller than a third circumferential interval C23 between the thirteenth nozzle 223 and the twenty-third nozzle 226.

In addition, as illustrated in FIG. 6, a first radial interval R21 between the eleventh nozzle 221 and the twelfth nozzle 222 may be set to be greater than a second radial interval R22 between the twelfth nozzle 222 and the thirteenth nozzle 223. Therefore, considering that the second circumferential interval C22 between the twelfth nozzle 222 and the twenty-second nozzle 225 is designed to be greater than the first circumferential interval C21 between the eleventh nozzle 221 and the twenty-first nozzle 224 and the second circumferential interval C22 is designed to be smaller than the third circumferential interval C23 between the thirteenth nozzle 223 and the twenty-third nozzle 226, the air contact surfaces of the droplets sprayed from the respective nozzles 220 may have an equal area in the case in which the first radial interval R21 between the eleventh nozzle 221 and the twelfth nozzle 222 is designed to be greater than the second radial interval R22 between the twelfth nozzle 222 and the thirteenth nozzle 223, and as a result, the evaporation may uniformly occur.

In particular, as illustrated in FIG. 7, the first and second radial intervals R21 and R22 and the first, second, and third circumferential intervals C21, C22, and C23 may be determined so that the air contact areas S21 and S22 of the droplets sprayed from the respective nozzles are equal to one another. For example, in a case in which the first air contact area S21 corresponding to one nozzle is defined by the first radial interval R21, the first circumferential interval C21, and the second circumferential interval C22 and a second air contact area S22 corresponding to another nozzle is defined by the second radial interval R22, the second circumferential interval C22, and the third circumferential interval C23, the first and second radial intervals R21 and R22 and the first, second, and third circumferential intervals C21, C22, C23 may be determined so that the first air contact area S21 and the second air contact area S22 may have an equal value. Therefore, since the air contact surfaces of the droplets sprayed from the respective nozzles 220 may have the equal area, the evaporation may uniformly occur, thereby further reducing compression work of the compressor. For reference, as illustrated in FIG. 7, each of the nozzles is positioned at a center of each of the air contact areas.

The invention claimed is:

1. An annular injection apparatus for wet compression which is used for a compressor including a nose cone and a bell mouth in an inlet of a flow path, wherein droplets are sprayed to a portion except for portions directed toward the nose cone and the bell mouth, comprising:

multiple annular pipes which are disposed concentrically to one another at intervals in a radial direction; and multiple nozzles which are disposed on respective annular pipes and disposed at intervals in a circumferential direction, wherein the multiple annular pipes are disposed at the portion except for the portions directed toward the nose cone and the bell mouth, wherein the multiple annular pipes include:

a first annular pipe;

a second annular pipe which is disposed to be spaced apart from the first annular pipe at a first radial interval in the radial direction; and a third annular pipe which is disposed to be spaced apart from the second annular pipe at a second radial interval in the radial direction, wherein the multiple nozzles include:

multiple first nozzles which are disposed on the first annular pipe at a first circumferential interval in the circumferential direction;

multiple second nozzles which are disposed on the second annular pipe at a second circumferential interval in the circumferential direction; and multiple third nozzles which are disposed on the third annular pipe at a third circumferential interval in the circumferential direction, wherein the first radial interval is set to be greater than the second radial interval, wherein the first circumferential interval is set to be smaller than the second circumferential interval, and the second circumferential interval is set to be smaller than the third circumferential interval, and wherein the first and second radial intervals and the first, second, and third circumferential intervals are determined so that air contact areas of the droplets sprayed from respective nozzles are equal to one another.

2. The annular injection apparatus for wet compression of claim 1, wherein a number of the multiple first nozzles, a number of the multiple second nozzles, and number of the multiple third nozzles are equal to one another, the multiple nozzles are disposed in multiple straight rows in the radial direction, and the multiple straight rows are placed at intervals in the circumferential direction.

3. The annular injection apparatus for wet compression of claim 1, wherein a number of the multiple first nozzles, a number of the multiple second nozzles, and a number of the multiple third nozzles are equal to one another, and the multiple nozzles are disposed in a zigzag pattern in the radial direction.

* * * * *